(12) United States Patent
Dare et al.

(10) Patent No.: US 7,937,584 B2
(45) Date of Patent: *May 3, 2011

(54) METHOD AND SYSTEM FOR KEY CERTIFICATION

(75) Inventors: Peter Roy Dare, Hampshire (GB); John Owlett, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 810 days.

This patent is subject to a terminal disclaimer.

(21) Appl. No.: 11/866,202

(22) Filed: Oct. 2, 2007

(65) Prior Publication Data

US 2008/0028209 A1      Jan. 31, 2008

Related U.S. Application Data

(63) Continuation of application No. 10/373,893, filed on Feb. 25, 2003, now Pat. No. 7,308,574.

(30) Foreign Application Priority Data

Feb. 28, 2002   (GB) .................................. 0204664.7

(51) Int. Cl.
   *H04L 9/32* (2006.01)
(52) U.S. Cl. ........ 713/157; 713/155; 713/156; 713/158; 726/2; 726/3; 726/4; 726/5
(58) Field of Classification Search .......... 713/155–157; 726/2–5
See application file for complete search history.

(56) References Cited

U.S. PATENT DOCUMENTS

| | | | |
|---|---|---|---|
| 5,659,616 A | 8/1997 | Sudia | |
| 6,215,872 B1 | 4/2001 | Van Oorschot | |
| 6,513,116 B1 | 1/2003 | Valente | |
| 6,816,900 B1 | 11/2004 | Vogel et al. | |
| 7,224,804 B2 * | 5/2007 | Ishiguro et al. | 380/279 |
| 7,539,861 B2 * | 5/2009 | Trench | 713/157 |
| 2002/0044662 A1 | 4/2002 | Sowler | |
| 2002/0147905 A1 | 10/2002 | Perlman | |
| 2002/0150250 A1 | 10/2002 | Kitaya et al. | |
| 2003/0115457 A1 | 6/2003 | Wildish et al. | |

FOREIGN PATENT DOCUMENTS

CA     2365441     7/2006

* cited by examiner

*Primary Examiner* — Edan Orgad
*Assistant Examiner* — Yin-Chen Shaw
(74) *Attorney, Agent, or Firm* — Schmeiser, Olson & Watts; William E. Schiesser

(57) ABSTRACT

A method and system for key certification in a public key infrastructure. The infrastructure has a network formed of a plurality of nodes. Each node has a private and public key pair. The nodes are either or both a certifying node and a certified node. A certifying node provides a digital certificate referring to the public key of a certified node. The digital certificate is signed by the private key of the certifying node. The method includes providing a root public key for a user, the root public key being at any node in the network chosen by the user, and providing a chain of digital certificates from the node with the root public key across the node network to any other node.

21 Claims, 7 Drawing Sheets

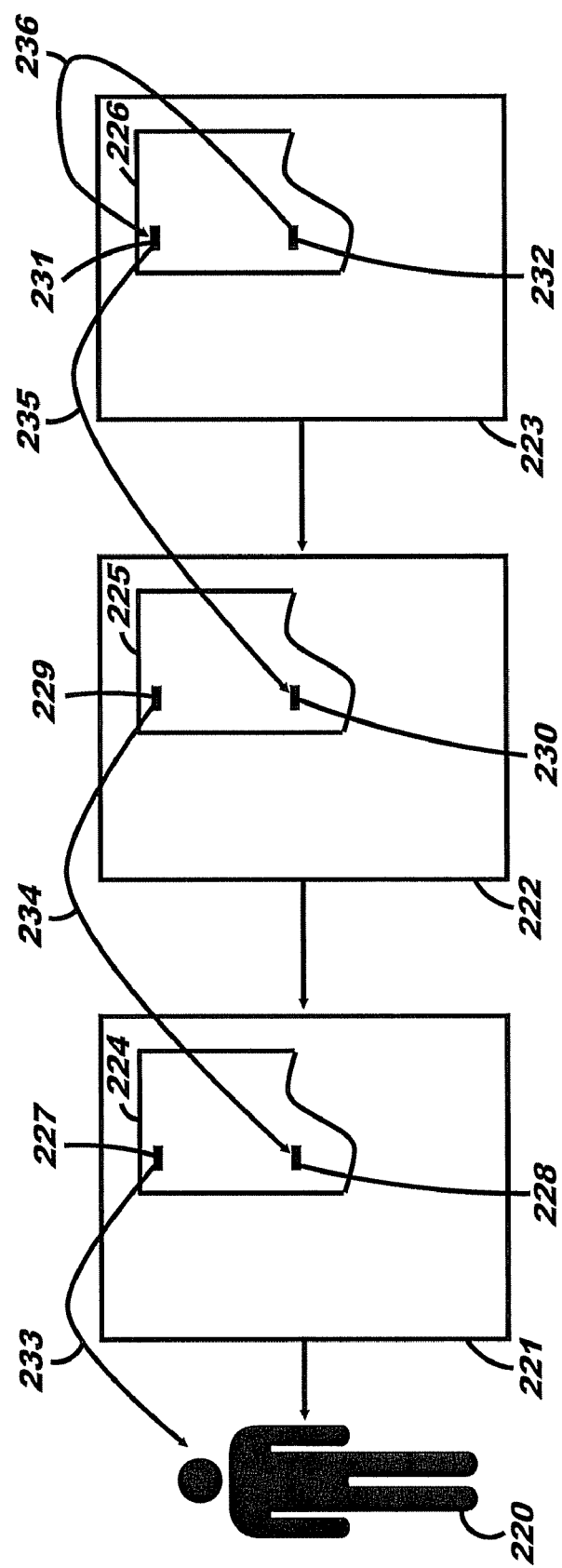

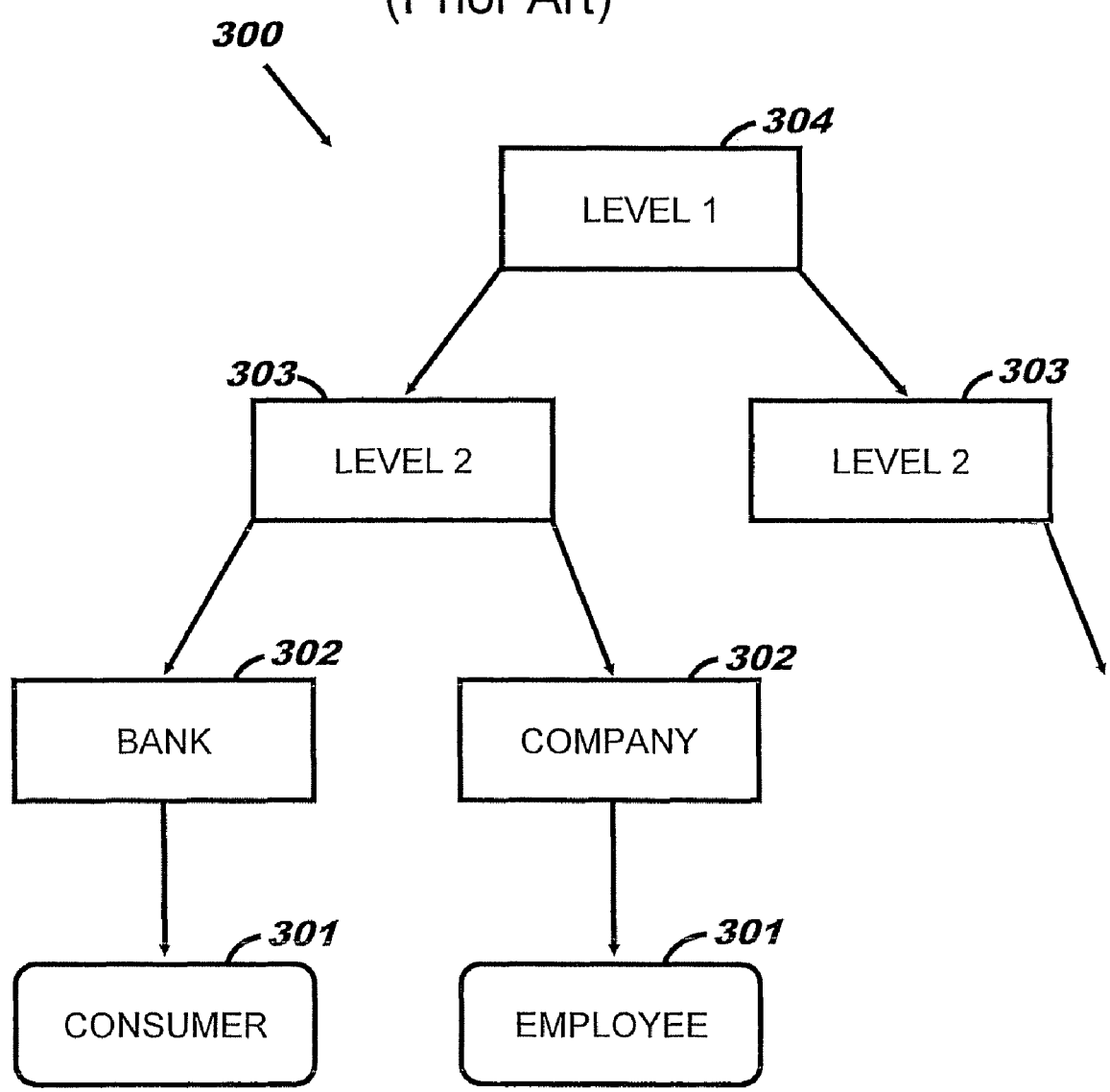

METHOD AND SYSTEM FOR KEY CERTIFICATION

This application is a continuation of Ser. No. 10/373,893, filed Feb. 25, 2003.

FIELD OF THE INVENTION

The invention relates to a method and system for key certification. In particular, the invention relates to key certification in the field of public key cryptography.

BACKGROUND OF THE INVENTION

Public key cryptosystems use a pair of asymmetric related keys, one for encryption and the other for decryption. Encryption in this context does not necessarily imply that the result is confidential, since data encrypted with a private key can be decrypted by anyone holding the public key—which may be widely available. One of the key pair, the private key, is kept secret by the user, while the other key, the public key, can be publicly disclosed. The key pair must have the property that, given knowledge of the public key, it is infeasible to determine the private key.

A user receives or, with suitable hardware or software, can generate for itself a pair of keys which are generally two large numbers. The user keeps one of these keys private and never discloses it. The other can be safely made public, just like a phone number or similar personal data. Due to the way the keys are generated, information encrypted with the private key can only be decrypted with the public key and vice versa. Using a key pair means that the sender and receiver do not need to share a secret key.

Public keys do not have to be published to the world. They can be shared as widely or narrowly as business and privacy requirements dictate.

The term "user" is defined as any entity including individuals, groups of individuals, one or more individuals in a role, corporations, organisations, computer applications or systems, automated machines, etc.

Public key cryptography makes the following possible:

Anyone knowing the user's public key can send the user a message encrypted with that key and can be sure that only the user—who alone has the corresponding private key—can decrypt it. This provides confidentiality.

The user might also encrypt a message with his private key. This cannot provide confidentiality, because anyone who knows the corresponding public key can decrypt it. But the fact that they can decrypt it means the message must have come from the user—who alone has the private key. This provides authentication and can also be used as a basis for non-repudiation—the digital equivalent of a signature.

If a sender signs a message with his own private key and then encrypts it with the recipient's public key, confidentiality, authentication and non-repudiation are provided together.

In practice, things are actually more complex. In the first situation, for performance and operational reasons, the sender will choose a random symmetric session key and a symmetric cipher to encrypt the message. The public key will be used to encrypt just the session key.

In the second situation above, a message is signed with a private key and this is known as a digital signature. One problem with signature methods is that cryptography can be slow due to the processing and communications overheads required. The volume of data sent can be more than double the size of the original message.

Confidentiality may not be required and it may be desirable to be able to send signed plaintext messages. A method can be used that does not require the entire message to be encrypted and therefore reduces processing and communication overheads. This method is based on obtaining a "digest" of the message the user wishes to sign. One form of obtaining a message digest is a hash function. A hash function is a one-way function which maps an arbitrarily long piece of plain text into a comparatively small fixed-length bit string which is the message digest.

The hash function has the property that if the message is changed in anyway an entirely different value of message digest is produced by the hash function. It should also not be possible to generate two messages that have the same message digest. Given P (plaintext) it should be easy to compute H(P) (hash of the plaintext). Given H(P) it should be effectively impossible to find P (the original plaintext).

In the second situation, the hash function is used to generate a message digest from the content of the message to be signed. The message digest is then encrypted using the private key of a key pair to obtain the signature. The original plaintext message is transmitted together with the signature.

A recipient of the message uses the same hash function to obtain a digest of the plaintext message that has been received. The recipient also decrypts the signature using the public key of the key pair and obtains the message digest which was sent by the originator. The recipient compares the two digests and if they are the same, the signature is verified and the recipient is assured of the integrity and authenticity of the message.

For public key encryption to be effective, a user must keep his private key secret. For example, this could be done by a password-protected smart card. In a traditional public key infrastructure, the user also needs a certificate for his public key. This certificate tells those the user deals with that the public key really does identify the user. The public key certificate is issued by a reputable agency, such as a bank.

A problem arises if the user is dealing with a business associate who does not know the bank issuing the certificate certifying the public key of the user. The bank itself can have a public key certificate, issued by a suitable umbrella organisation. That umbrella organisation too can have a public key certificate. This can result in a chain of certificates leading to a point (referred to as the root) which the business associate does know. The hierarchical chains of certificates ultimately end with a master organisation at the top of the hierarchical tree which has a self-signed certificate. This means that the public key of the self-signed certificate must be obtained by means outside the public key infrastructure system. Such means outside the system must include a "witnessable event", to initiate (or, in computing jargon, "bootstrap") the electronic infrastructure.

A means by which users can obtain the public key certificates they need, and be sure that those certificates are valid, is known as a public key infrastructure (PKI). A traditional PKI includes a Registration Authority (RA) to approve the issue of public key certificates, a Certificate Authority (CA) to issue those certificates, and a Directory to store them.

An RA represents the organisation, processes, procedures and systems that approve, create, renew, suspend or revoke unique key pairs. The RA is responsible for ensuring the uniqueness of the key pair within its name space and—depending upon how the RA is implemented—validating that the recipient of key pair (a person, application, server, hardware device, or file) is authorised to perform the privileges associated with it. This privilege validation could alternatively be performed by a Certificate Authority (see below). The RA can be managed internally or outsourced through a growing number of service providers.

A CA represents the organisation, processes, procedures and systems that control the issuance, renewal, suspension and revocation of digital certificates based on public keys approved by the registration authority. It may also be responsible for maintaining and publishing a list of the user community through its underlying directory structure. Like the RA, the CA can be outsourced as a service, but many enterprises prefer to manage both the CA and RA services internally, integrating them with other related administration processes such as human resource management.

Known PKI systems include the SET (Secure Electronic Transactions) system for credit card transactions in which a PKI tree hierarchy has a master SET root at the top of the hierarchy which has a self-signed public key. A lower level of the hierarchy is the brand of credit card. A lower level still is the banks issuing the credit cards and the lowest level of the hierarchy is the consumer.

A consumer can obtain a root public key from his bank, for example by visiting a branch of the bank and obtaining the bank's root CD-ROM which includes the bank's self-signed digital certificate. The consumer trusts the authenticity of the root public key obtained from the bank. However, the consumer has no means of authenticating a public key of any other node of the tree hierarchy.

The only "global" root public key available in the hierarchy that can authenticate all the other nodes in the tree hierarchy is that of the master SET root. If the public key is obtained for the master SET root by the consumer, the consumer can obtain certificates certifying the public keys of all other nodes in the hierarchy.

Known PKI hierarchies of this nature have the disadvantage that the user may not trust the master global root. Trust in this context is defined as knowing the identity of a party and having a record of performance of the party. Such trust can be passed between parties, if a trusted party recommends another party.

It is an aim of the present invention to enable a user to choose a root from which to obtain a root public key from any node in a PKI and to enable the user to use the root public key as a global root key to obtain a chain of certificates along a path to any other node in the PKI. This enables the user to choose an entity for its global root which it trusts.

SUMMARY OF THE INVENTION

According to a first aspect of the present invention there is provided a method for key certification in a public key infrastructure, the public key infrastructure having a network formed of a plurality of nodes, each node having a private and public key pair, the nodes being either or both a certifying node and a certified node, a certifying node providing a digital certificate making reference to the public key of a certified node and the digital certificate being signed by the private key of the certifying node, the method comprising: providing a root public key for a user, the root public key being at a any node in the network chosen by the user, and providing a chain of digital certificates from the node with the root public key across the node network to any other node.

A root public key may be a public key obtained by a user by means outside the public key infrastructure. Such means may include a witnessable event or may itself rely on a means including a witnessable event.

A chain of digital certificates may be a sequence of nodes with a certificate for each adjacent pair of nodes, where the first node of a pair is a certifying node and the second node of a pair is a certified node.

A node may have a computer interface for any one of a user, one or more individuals, one or more individuals in a role, corporations, organisations, computer applications, automated machines, or any other entity.

The node network may be a hierarchical network and a node may provide a digital certificate for a node below it, above it or at the same level as it on a different branch in the hierarchical network. A chain of digital certificates may lead up, down and/or across a node network.

A digital certificate may include information relating to a certified node including a distinguished name for the certified node and its public key, the digital certificate being signed with the certifying node's private key. The digital certificate may be signed by forming a digest of the information in the certificate and signing the digest with the certifying node's private key. The digital certificate may also contain one or more of the following information: a certificate number, a digest function, an encryption algorithm, the name of the certifying node, an address of the certifying node, an expiry date of the certified node's public key, any other data item.

According to a second aspect of the present invention there is provided a system for key certification in a public key infrastructure, the public key infrastructure having a network formed of a plurality of nodes, each node having a private and public key pair, the nodes being either or both a certifying node and a certified node, a certifying node providing a digital certificate making reference to the public key of a certified node and the digital certificate being signed by the private key of the certifying node, the system comprising: a root public key for a user, the root public key being at a any node in the network chosen by the user, and a chain of digital certificates from the node with the root public key across the node network to any other node.

A root public key may be a public key obtained by a user by means outside the public key infrastructure.

A chain of digital certificates may be a sequence of nodes with a certificate for each adjacent pair of nodes, where the first node of a pair is a certifying node and the second node of a pair is a certified node.

A node may have a computer interface for any one of a user, one or more individuals, one or more individuals in a role, corporations, organisations, computer applications, automated machines, or any other entity.

The node network may be a hierarchical network and a node may provide a digital certificate for a node below it, above it or at the same level as it on a different branch in the hierarchical network. A chain of digital certificates may lead up, down and/or across a node network.

A digital certificate may include information relating to a certified node including a distinguished name for the certified node and its public key, the digital certificate being signed with the certifying node's private key. The digital certificate may be signed by forming a digest of the information in the certificate and signing the digest with the certifying node's private key. The digital certificate may also contain one or more of the following information: a certificate number, a digest function, an encryption algorithm, the name of the certifying node, an address of the certifying node, an expiry date of the certified node's public key, any other data item.

According to a third aspect of the present invention there is provided a computer program product stored on a computer readable storage medium for key certification in a public key infrastructure, the public key infrastructure having a network formed of a plurality of nodes, each node having a private and public key pair, the nodes being either or both a certifying node and a certified node, a certifying node providing a digital certificate making reference to the public key of a certified node and the digital certificate being signed by the private key of the certifying node, comprising computer readable program code means for performing the steps of: providing a root public key for a user, the root public key being at a any node in the network chosen by the user, and providing a chain of digital certificates from the node with the root public key across the node network to any other node.

BRIEF DESCRIPTION OF THE DRAWINGS

A preferred embodiment of the invention will now be described in detail by way of example only with reference to the following drawings:

FIG. 2B is a diagram of a certificate chain;

FIG. 3 is a diagram of a public key infrastructure with a certificate supplier hierarchy;

DETAILED DESCRIPTION

Figure 1A:
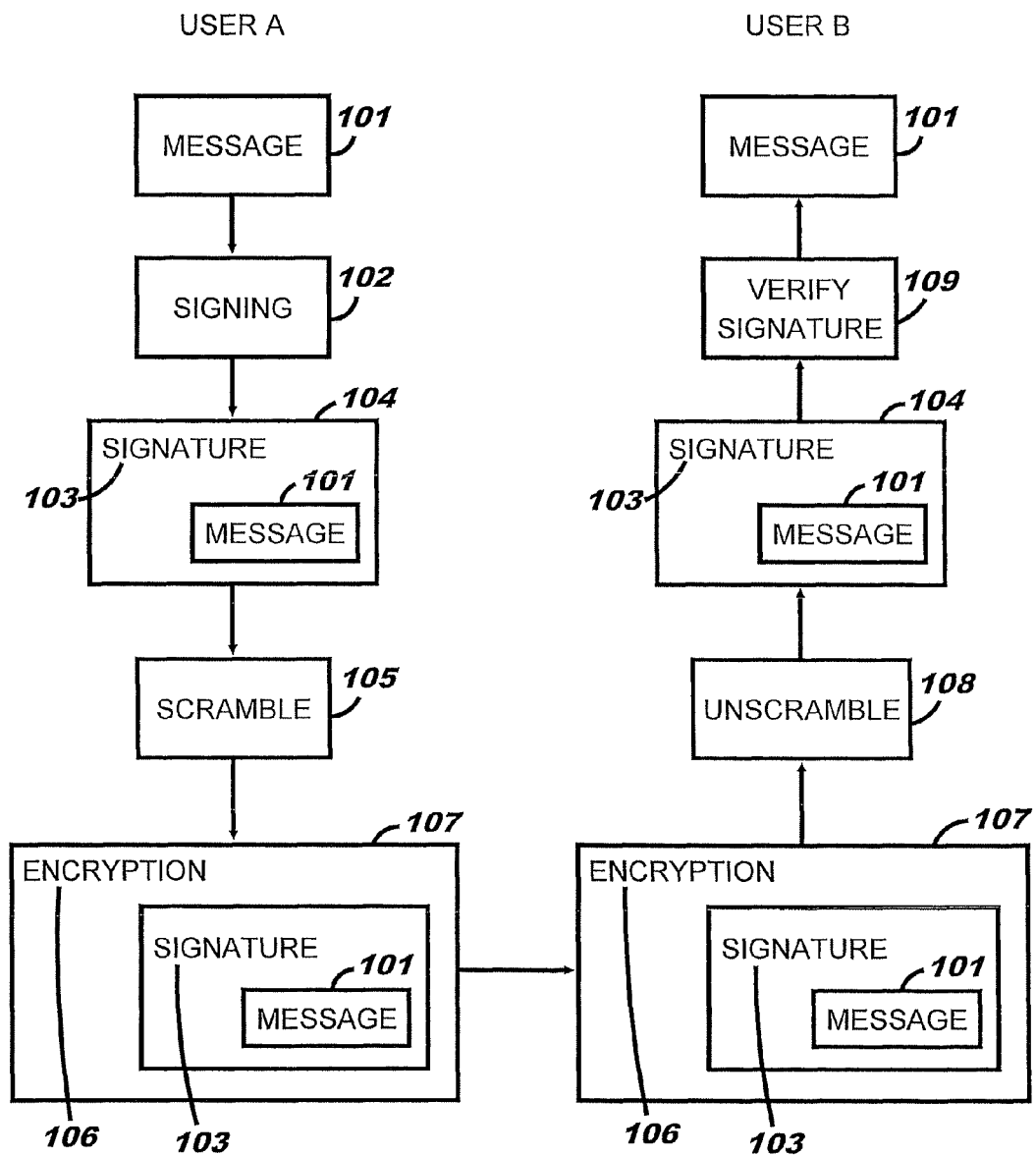
FIG. 1A is a diagram of a conventional encryption procedure.

Referring to FIG. 1A, the known method of sending a message using public key cryptography is illustrated. Public key pairs can be used to sign and scramble a message.

User A wishes to send a message 101 to user B. User A signs 102 the message 101 by using A's private key. This encryption enables the recipient to verify that the message 101 has come from user A who is the only user to know user A's private key. This results in a set of data 104 formed by encrypting the original message 101 into a signature 103.

The set of data 104 is then scrambled 105 in order to keep the message confidential. This scrambling 105 is carried out by user A encrypting the set of data 104 with user B's public key. This ensures that only user B will be able to unscramble the set of data 104. This results in a set of data 106 formed of an encryption 107 of the signature 103 which includes the message 101. The set of data 106 is transmitted to user B.

User B carries out the reverse process. User B unscrambles 108 the set of data 106 by decrypting the data 106 using user B's private key. User B then has the set of data 104 in the form of the signature 103 and the message 101. User B can verify that the message 101 came from user A by decrypting the set of data 104 using user A's public key. User B then has the message 101 which only user B could have unscrambled with the reassurance that the message 101 did come from user A.

Figure 1B:
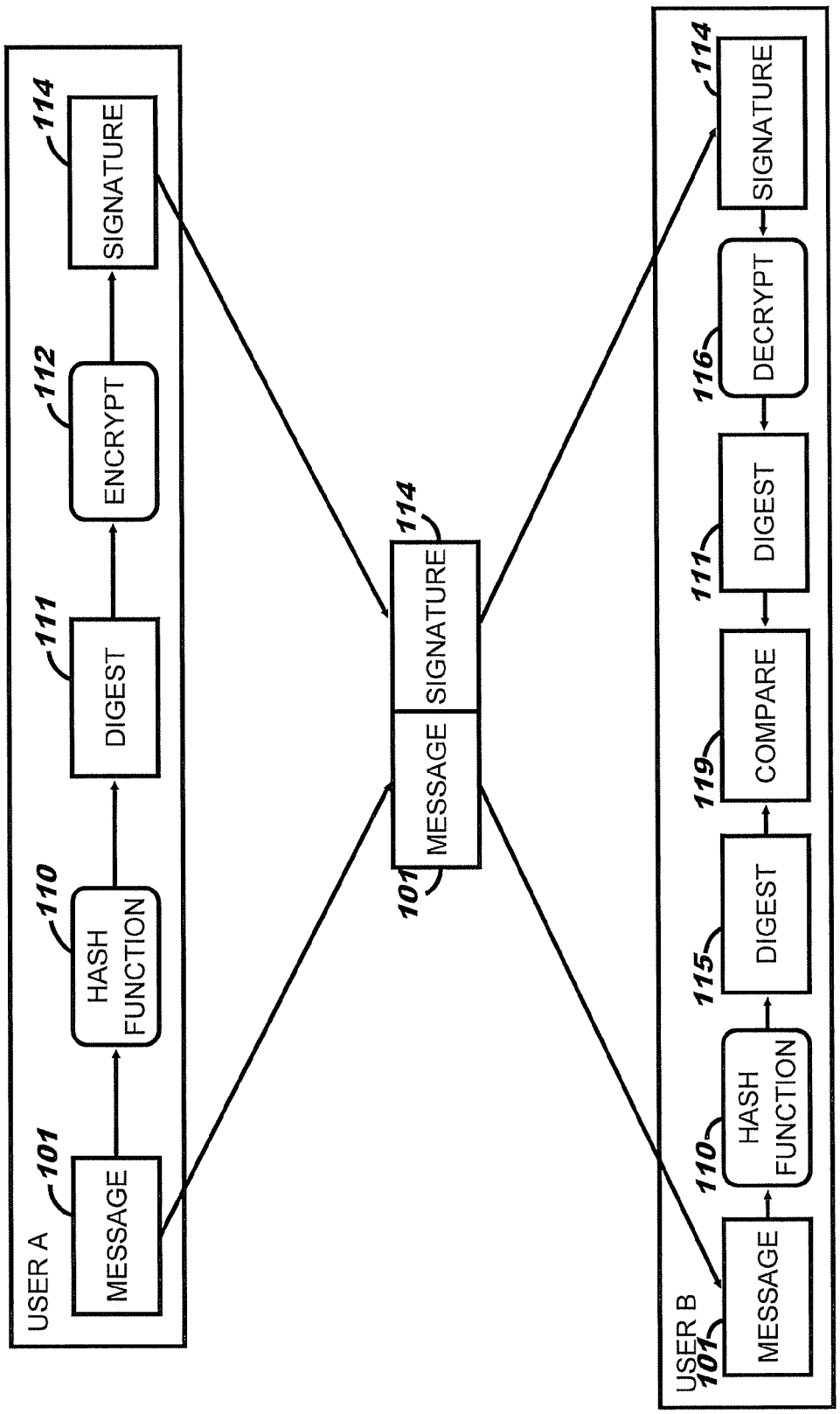
FIG. 1B is a diagram of a conventional signing procedure.

FIG. 1B illustrates the known method of signing using a public key cryptography system. User A wishes to send a message 101 to user B. User A uses a hash function 110 to obtain a digest 111 of the message 101. The digest 111 is then encrypted 112 using user A's private key to obtain a signature 114. User A sends the message 101 and the signature 114 to user B.

User B applies the same hash function 110 to the message 101 it has received to obtain a digest 115. User B also decrypts 116 the signature 114 it has received using user A's public key. The decrypted signature is the digest 111 made by user A. The digest 111 obtained by decrypting the signature is compared 119 to the digest 115 made by the recipient. If the two digests are the same, the message 101 has been verified by the signature.

In order for the above methods of public key cryptography to work, users' public keys are available to all participants in the infrastructure. The level of availability may vary: for example, a user's public key may be disclosed to selected parties directly by the user or a user's public key may be published in a directory. The public key needs to be trusted. It is possible that an impostor could publish a public key stating that it is the public key of another party in order to pose as the other party and receive and send fraudulent messages.

To verify that a public key is in fact the public key of a given user, a certificate for the public key is issued by a certifying source. The certificate is of the form of a digital certificate which secures digital information within the certificate by means of a digital signature using the certifying source's private key.

Through the certificate, the certifying source is providing a statement to the party relying on the information in the certificate that it is genuine. It is the relying party that must assess the extent to which it should trust this statement.

Certificates may be created for different purposes and may be issued using different practices and procedures. These processes are termed the Certificate Policy. One of the most widespread certificate standards is X.509, which defines the certificate policy as "a named set of rules that indicates the applicability of a certificate to a particular community and/or class of application with common security requirements". The certificate policy is the heart of any PKI scheme; it is on the policy that users will rely.

Figure 2A:
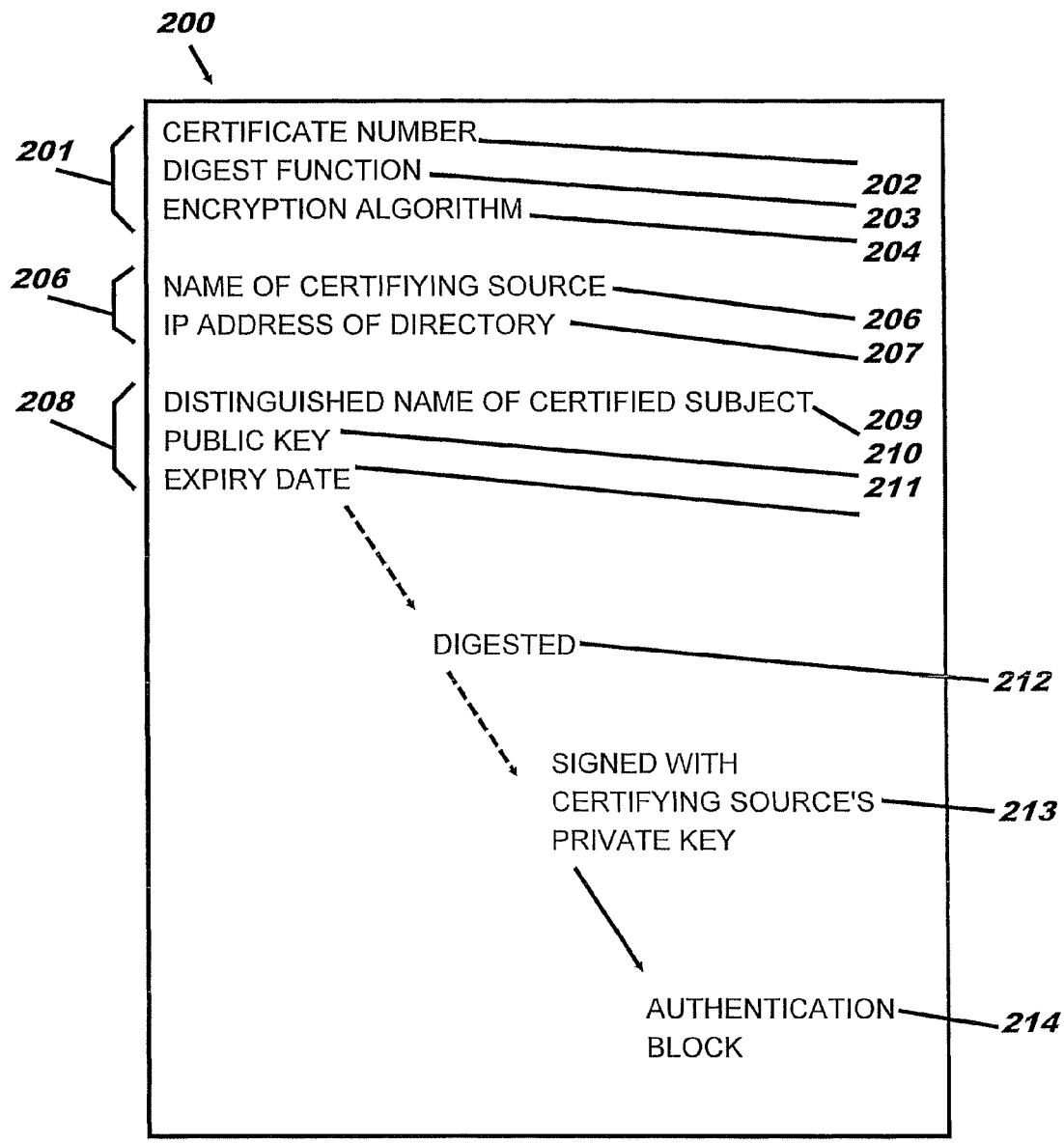
FIG. 2A is a diagram of a digital certificate certifying a public key.

FIG. 2A illustrates an example format for a certificate. The certificate 200 includes technical information 201 that may include a certificate number 202, the function 203 used to digest the signature, the encryption algorithm 204 used, etc. The certificate 200 also includes information 205 regarding the certifying source issuing the certificate 200. For example, the certifying source may be a Certificate Authority (CA). The information 205 may also include the name of the certifying source 206, an IP address 207 of the directory held by the certifying source, etc.

The certificate 200 also includes subject information 208 for the entity whose public key is being certified. The subject information 208 may include a distinguished name 209 of the subject for identifying the entity, the entity's public key 210, an expiry date of the public key 211, and any other information.

The information 201, 205, 208 is digested 212 and signed 213 by the certifying source using the certifying source's private key resulting in an authentication block 214.

The information in the certificate is clear text and available to be read by any party. However, if the information is to be relied upon, the authentication block 214 must be verified by decrypting the signature digest as explained in relation to FIG. 1B using the certifying source's public key.

If a relying party already knows and has verification of the certifying source's public key, this is sufficient for the relying party to rely on and be confident in the use of the entity's public key.

However, if the relying party does not have knowledge of the certifying source's public key, a certificate certifying the certifying source's public key is also needed. This can result in a chain of certificates.

FIG. 2B shows a known example of a certificate chain. A user 220 wishes to verify a public key of another entity 221 with which the user wishes to communicate and to do business. The entity 221 has a certificate 224 certified by his bank 222.

The entity's certificate 224 includes the information of the entity's public key 227 which the user 220 can read. The user 220 can verify the public key 227 by checking the authentication block 228 in the certificate 224. The authentication block 228 is signed using the private key of the bank 222.

The user 220 needs to obtain the bank's public key 229 which can then be used to check 234 the authentication block 228 of the entity's certificate 224. The bank 222 in turn has a certificate 225 providing the bank's public key 229 and an authentication block 230 signed by a higher level authority 223 using the private key of the higher level authority 223.

The higher level authority 223 is an authority which the user 220 knows and the user 220 has previously obtained, by means outside the public key infrastructure (such as a CD-ROM), the higher level authority's self-signed certificate 226. The self-signed certificate 226 provides the public key 231 of the higher level authority 223 and has an authentication block 232 signed using the private key corresponding to the public key 231.

In this way, the user 220 can use the chain of certificates starting from the self-signed certificate 226 to verify 233 the public key 227 of the entity 221. Then authentication block 232 of the self-signed certificate 226 confirms 236 the public key 231 of the higher level authority 223. The public key 231 of the higher level authority 223 is used to decrypt 235 the authentication block 230 of the bank 222 and to confirm the public key 229 of the bank 222. The public key 229 of the bank 222 is used to decrypt 234 the authentication block 228 of the entity 221 and to confirm the public key 227 of the entity 221 for use by the user 220.

FIG. 3 shows a known hierarchy of certificate sources shown as nodes. A bottom level certificate holder 301 in the hierarchy 300 can be, for example, a consumer, an employee, a natural person or a group of people, etc. The bottom level certificate holder 301 has its certificate issued by a trusted authority 302, for example, a bank for the consumer or a company for the employee.

The trusted authority 302 itself has a certificate issued by a higher body 303 referred to in the figure as a "level 2" trusted authority which could be, for example, a bank regulating body.

The level 2 trusted authorities 303 have certificates issued by a centralised body 304 referred to in the figure as a "level 1" trusted authority which, in this example, is the highest level of trusted authority in the hierarchy 300. As the highest level of the hierarchy, the centralised body 304 has a "self-signed certificate". This means that the public key of the centralised body 304 must be obtained by means outside the system and can be verified by the self-signed certificate of the centralised body 304.

A self-signed certificate is merely an example of a way of representing a root key—it is convenient in computer processing since it can mark the end of a certificate chain. Any other representation could be used instead.

The centralised body 304 has the only "global root key" of the hierarchy because only from this node can the public keys of all the other nodes be certified. The arrows between the nodes show the direction in which the certification of the public key is provided. All the nodes at the start of the arrows are "certifying nodes" and all the nodes at the ends of the arrows below another node are "certified nodes". This is referred to as the "centralised model".

A root key can be obtained by a user at a node in the hierarchy. For example, a consumer 301 can go to a branch of his bank 302 and obtain a CD-ROM containing the banks public key in the form of a self-signed certificate. The consumer 301 will trust the public key he has obtained and no further certificate chain is needed. However, the consumer 301 cannot verify the public key of any other node in the hierarchy above the bank 302 or in a different branch of the hierarchy without obtaining and using the level 1 public key—even if the consumer has experience to justify trusting it.

At each level of the hierarchy 300, each trusted authority includes the roles of a Certificate Authority (CA) and Registration Authority (RA) authenticating the identity of the next lower level in the hierarchy. At each level it is the responsibility of the certificate issuer to ensure the authenticity of the holder.

It is also known for a level 1 trusted authority to cross-certify another level 1 trusted authority if a separate hierarchy thereby linking users of hierarchies stemming from different centralised bodies.

Peer level trusted authorities can also cross-certify each other. This is referred to as the "correspondent model" and is based on the identification by two peer level certificate issuers (trusted authorities) that they have certificate policies that are equal. By cross-certifying their respective policies, one to the other, certificates issued by either authority can be treated as if they were also in the other scheme.

In the method and system of the present invention, reverse certification can be practised. A lower level node can provide a certificate for a public key of a higher level node. Such a certificate will be of the form shown in FIG. 2A with the information 205 relating to the certifying source and the information 208 relating to the certified subject and the certificate signed with the private key of the certifying source.

Figure 4:
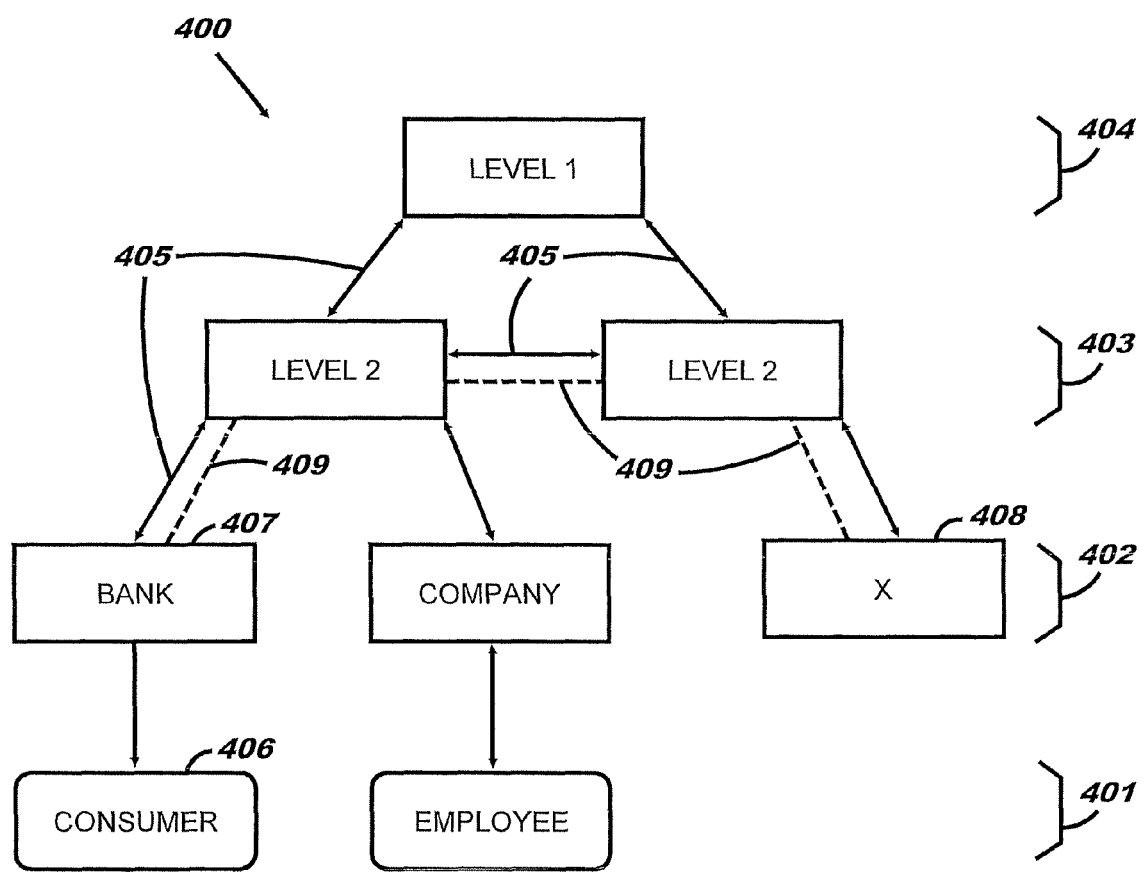
FIG. 4 is a diagram of a public key infrastructure showing a key certification in accordance with the present invention.

Referring to FIG. 4, a hierarchy of certificate source nodes is shown in accordance with the described method and system. A similar hierarchy 400 is shown to that of FIG. 3 with four levels of nodes 401, 402, 403, 404 starting from the lowest 401 to the highest level 404 in the hierarchy 400.

The double-headed arrows 405 illustrate certification of the nodes in both directions. Each one of an adjacent pair of nodes provides a certificate for the other node of the pair. The adjacent nodes can also be on the same level of the hierarchy.

Any node may be chosen by a user 406 to be its root node 407 and the user obtains the public key for that node 407. The root node 407 is a global root node as there is a path from it to any other node in the hierarchy 400.

For example, if the consumer 406 obtains the CD-ROM with the self-signed certificate for the bank 407 and extracts the bank's public key, the bank 407 is the consumer's chosen root node. There is a path from the bank 407 to any other node in the PKI and the bank 407 is therefore the global root for the consumer 406.

If the consumer 406 wishes to carry out a transaction with an entity "X" 408 in the hierarchy 400, the consumer 406 will need to know and have verification of the public key of entity "X" 408. The consumer 406 trusts the bank 407 and has a trusted copy of the bank's public key. A path 409 (shown in dashed lines) can be followed from the bank's public key along a chain of certificates in order to verify the public key of entity "X" 408.

A root node could issue certificates to every other node in a PKI network although this may be unnecessary. As another possible procedure, a first node could issue a certificate back to any second node issuing a certificate for the first node. This will ensure that the PKI grows with certificates between nodes in both directions.

Certificate chains across a PKI form a path between nodes. The nodes form a web which is can be navigated in both directions between nodes.

Figure 5:
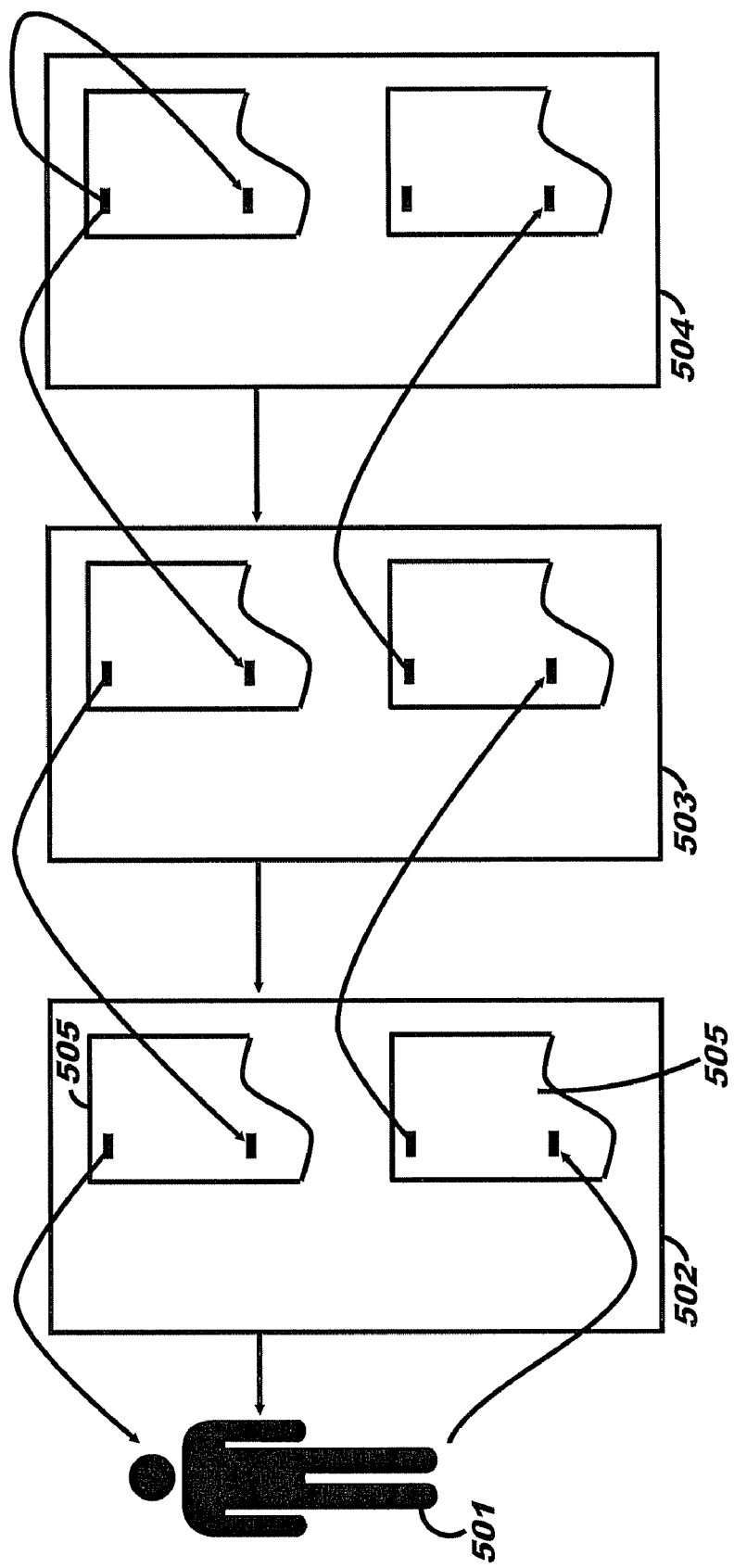
FIG. 5 is a diagram of a certificate chain including reverse certificates in accordance with the present invention.

FIG. 5 shows a path through a hierarchy connecting nodes 502, 503, 504 and a user 501. Certificates 505 are provided at each node 502, 503, 504 certifying the adjacent node in both directions.

In summary, in conventional PKI systems, if a trusted authority has a root key, then anyone who knows that root key can use it for identifying the schemes it administers and, via the schemes, the scheme members. If someone claims to be a member of a particular scheme, and sends a certificate issued by that scheme, that certificate can be used for identification and authentication:

The method of identification and authentication is as follows:

Obtain the scheme's certificate—which is signed by the trusted authority.

Check that neither the scheme certificate nor the member certificate has been revoked.

Use the trusted authority root key to check the scheme certificate. Identification of the scheme is complete. A user can be confident that the scheme exists and that he has its public key.

The scheme public key is used to check the member certificate. Identification of the member is now complete. A user can be confident that the member exists and that he has its public key.

The scheme member has not yet been authenticated. Anyone may obtain a copy of his certificate, so it still need to be checked that the sender is indeed the scheme member himself. Accordingly, a random challenge is sent by the user to the sender; he encrypts it with his private key; and the user decrypts it with the public key from the certificate. If that gets the user back to the original challenge, then the sender has been authenticated as the certificate holder.

This process—which is carried out automatically by a computer as soon as connection is made—depends upon the user's confidence in the trusted authority's root key. Obviously, a responsible trusted authority is going to carry out its business so that its root key is reliable, and so that this process rarely, if ever, goes wrong. But the trusted authority is unlikely to be willing to accept that it is liable without prior agreement. It may have liability because of legislation in the country where it is based, or it may be willing to accept liability as part of a contractual agreement.

The problem with a traditional PKI is that there is no contractual agreement between a trusted authority and most users of its root key. Only those scheme members to whom it has issued a certificate have a contract with it, not the members of other schemes who wish to authenticate its members.

What is needed is for an entity to issue a user with a "global root key" that will authenticate all other trusted authorities and schemes the user might need to deal with, and who will accept liability if that authentication is wrong.

One way of doing this—in the centralised model shown in FIG. 2B—would be for the user to use the centralised body's root key as its global root key. If the user establishes a contractual relationship with the centralised body, then it can use that key to identify any member of any scheme in any trusted authority network that is part of the hierarchy 200 under the centralised body. The user knows that it shall be indemnified by the centralised body if anything goes wrong.

A very important aspect of the described method is that it doesn't have to be a centralised body at the highest level of a hierarchy that supplies the global root key. As long as the user can build a chain of certificates from the global root key it is using to the certificate the user wishes to validate, and the issuer of the user's global root key agrees to accept liability, then the user can use the hierarchy network with confidence.

As a second way of doing this, in the correspondent model, if the centralised body arranges a common liability arrangement among its member level 2 trusted authorities then the user can use the root key of any level 2 trusted authority as its global root key. The user's level 2 trusted authority authorises the other level 2 trusted authorities, which authorise their schemes, which authorise the scheme members—and the user's protection is assured.

Even this is not the most devolved arrangement. In particular, the user might wish to have the issuer of its global root key based in its country of residence. That way, any contract is in one jurisdiction and one language. It might be a scheme trusted authority that—as well as having a certificate issued by the level 2 trusted authority—also issues a certificate for the level 2 trusted authority. This "certifying up the hierarchy" means that the user can then use the rest of the certificate network. Or it might be a third party who chooses to set up such a business and enters into agreements with the user and with the centralised body for downstream liability.

The system is very flexible. Everyone has a personal global root key—a root key issued by an organisation which is under contract to provide reliability and liability. There does not need to be a universal global root key that everyone uses, established in a jurisdiction over which nobody has a choice. The essence is that the centralised body should provide a structure in which maximum choice is possible.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Modifications and improvements can be made to the foregoing without departing from the scope of the present invention.

The invention claimed is:

1. A method for key certification in a public key infrastructure, said public key infrastructure having a node network formed of a plurality of nodes that comprises a first entity node and a first global root node, said method comprising:

providing a first root public key for a first user by a first means outside the public key infrastructure, said first root public key being at the first global root node, wherein each pair of adjacent nodes of the plurality of nodes consists of a first node and second node such that the first node is configured to provide a digital certificate for certifying the second node and the second node is configured to provide a digital certificate for certifying the first node; and providing a first chain of digital certificates in a first nodal path from the first global root node across the node network to a first entity node, wherein the first chain of digital certificates enables the first user to verify a public key of the first entity node;

wherein the plurality of nodes consists of a plurality of computer nodes;

wherein the nodes of the plurality of nodes are trusted authorities arranged in a hierarchy having L levels denoted as levels 1, 2, 3 . . . . L subject to L being at least 3;

wherein level 1 consists of a highest node of the hierarchy;

wherein level j consists of at least two nodes of the hierarchy, each node of level j being a child node of level j-1 for j =2, 3. . . . L;

wherein level 3 consists of at least three nodes of the hierarchy;

wherein the first entity node is a node of a level of at least 3 and not exceeding L;

wherein the first global root node is a selected node of level 2;

wherein the method further comprises prior to said providing the first root public key for the first user and prior to said providing the first chain of digital certificates:

arranging a common liability agreement among the nodes of level 2 by which the nodes of level 2 agree to accept liability to any user who selects a node of level 2 as a global root node in a chain of digital certificates for verifying a public key of any other node of the hierarchy, said arranging being performed by the highest node of the hierarchy; and after said arranging, receiving an identification from the user of the first global root node after the user selected the first global root node as the selected node of level 2.

2. The method of claim 1, wherein the first nodal path consists of N sequentially ordered nodes $X_1, X_2, \ldots, X_N$ respectively comprising digital certificates $C_1, C_2, \ldots, C_N$;

wherein $X_1$ is the first global root node and $X_N$ is the first entity node;

wherein $C_1, C_2, \ldots, C_N$ defines the first chain of digital certificates;

wherein the digital certificate $C_{i+1}$ comprises a public key $PK_{i+1}$ and an authentication block signed using a private key of node $X_i$ for i=1, 2, . . . , N-1;

wherein $PK_N$ is the public key of the first entity node;

wherein N is a positive integer of at least 2;

wherein the digital certificate $C_1$ of the first global root node $X_1$ is a self-signed digital certificate that comprises both a public key $PK_1$ of the first global root node $X_1$ and an authentication block signed using a private key of the first global root node $X_1$, wherein the digital certificate $C_1$ of the first global root node represents the first root public key; and wherein for i=1, 2, . . . , N: digital certificate $C_i$ comprises certificate information consisting of the authentication block, the public key $PK_i$, a certificate number, a function used to digest a digital signature of the signed authentication block, an encryption algorithm used to encrypt the authentication block, a name of a certifying source issuing the digital certificate, an IP address of a directory held by the certifying source, a distinguished name identifying node $X_i$, and an expiry date of the public key $PK_i$.

3. The method of claim 1, wherein the plurality of nodes that comprises a second global root node and a second global root node that differs from the first global root node, and wherein the method further comprises:

providing a second root public key for a second user by a second means outside the public key infrastructure, said second root public key being at the second global root node; and providing a second chain of digital certificates in a second nodal path from the second global root node across the node network to the second entity node, wherein the second chain of digital certificates enables the second user to verify a public key of the second entity node.

4. The method of claim 3, wherein the second entity node is the first global root node.

5. The method of claim 4, wherein the second global root node is the first entity node.

6. The method of claim 5, wherein the first nodal path consists of N sequentially ordered nodes $X_1, X_2, \ldots, X_N$ respectively comprising digital certificates $C_1, C_2, \ldots, C_N$, wherein $X_1$ is the first global root node and $X_N$ is the first entity node, and wherein the second nodal path consists of the N sequentially ordered nodes $X_N, \ldots, X_2, X_1$, and wherein N is a positive integer of at least 3.

7. The method of claim 5, wherein the first global root node and the first entity node are adjacent nodes of the plurality of nodes.

8. The method of claim 5, wherein at least one node in the second nodal path is not in the first nodal path.

9. The method of claim 1, wherein the digital certificate of each node of the plurality of nodes is a self-signed digital certificate that comprises both a public key of said each node and an authentication block signed using a private key of said each node, and wherein the digital certificate of the first global root node represents the first root public key.

10. A system for key certification in a public key infrastructure, said public key infrastructure having a node network formed of a plurality of nodes that comprises a first entity node and a first global root node, said system comprising:

a plurality of computer nodes;

a first root public key for a first user by a first means outside the public key infrastructure, said first root public key being at the first global root node, wherein each pair of adjacent nodes of the plurality of nodes consists of a first node and second node such that the first node is configured to provide a digital certificate for certifying the second node and the second node is configured to provide a digital certificate for certifying the first node, and wherein each node of the plurality of nodes is a computer node of the plurality of computer nodes; and a first chain of digital certificates in a first nodal path from the first global root node across the node network to a first entity node, wherein the first chain of digital certificates enables the first user to verify a public key of the first entity node;

wherein the nodes of the plurality of nodes are trusted authorities arranged in a hierarchy having L levels denoted as levels 1, 2, 3 L subject to L being at least 3;

wherein level 1 consists of a highest node of the hierarchy;

wherein level j consists of at least two nodes of the hierarchy, each node of level j being a child node of level j-1 for j =2, 3. . . L;

wherein level 3 consists of at least three nodes of the hierarchy;

wherein the first entity node is a node of a level of at least 3 and not exceeding L;

wherein the first global root node is a selected node of level 2;

wherein the system further comprises a common liability agreement among the nodes of level 2 by which the nodes of level 2 agree to accept liability to any user who selects a node of level 2 as a global root node in a chain of digital certificates for verifying a public key of any other node of the hierarchy, said common liability agreement having been arranged by the highest node of the hierarchy, said selected the first global root node having been selected by the user after the highest node of the hierarchy arranged the common liability agreement.

11. The system of claim 10, wherein the first nodal path consists of N sequentially ordered nodes $X_1, X_2, \ldots, X_N$ respectively comprising digital certificates $C_1, C_2, \ldots, C_N$;

wherein $X_1$ is the first global root node and $X_N$ is the first entity node;

wherein $C_1, C_2, \ldots, C_N$ defines the first chain of digital certificates;

wherein the digital certificate $C_{i+1}$ comprises a public key $PK_{i+1}$ and an authentication block signed using a private key of node $X_i$ for i=1, 2, ..., N-1;

wherein $PK_N$ is the public key of the first entity node;

wherein N is a positive integer of at least 2;

wherein the digital certificate $C_1$ of the first global root node $X_1$ is a self-signed digital certificate that comprises both a public key $PK_1$ of the first global root node $X_1$ and an authentication block signed using a private key of the first global root node $X_1$, and wherein the digital certificate $C_1$ of the first global root node represents the first root public key; and wherein for i=1, 2, ..., N: digital certificate $C_i$ comprises certificate information consisting of the authentication block, the public key $PK_i$, a certificate number, a function used to digest a digital signature of the signed authentication block, an encryption algorithm used to encrypt the authentication block, a name of a certifying source issuing the digital certificate, an IP address of a directory held by the certifying source, a distinguished name identifying node $X_i$, and an expiry date of the public key $PK_i$.

12. The system of claim 10, wherein the plurality of nodes that comprises a second global root node and a second global root node that differs from the first global root node, and wherein the system further comprises:

a second root public key for a second user by a second means outside the public key infrastructure, said second root public key being at the second global root node; and a second chain of digital certificates in a second nodal path from the second global root node across the node network to the second entity node, wherein the second chain of digital certificates enables the second user to verify a public key of the second entity node.

13. The system of claim 12, wherein the second entity node is the first global root node.

14. The system of claim 13, wherein the second global root node is the first entity node.

15. The system of claim 14, wherein the first nodal path consists of N sequentially ordered nodes $X_1, X_2, \ldots, X_N$ respectively comprising digital certificates $C_1, C_2, \ldots, C_N$, wherein $X_1$ is the first global root node and $X_N$ is the first entity node, and wherein the second nodal path consists of the N sequentially ordered nodes $X_N, \ldots, X_2, X_1$, and wherein N is a positive integer of at least 3.

16. A computer program product, comprising a computer readable storage device having computer readable program code stored therein, said computer readable program code configured to perform a method for key certification in a public key infrastructure, said public key infrastructure having a node network formed of a plurality of nodes that comprises a first entity node and a first global root node, said method comprising:

providing a first root public key for a first user by a first means outside the public key infrastructure, said first root public key being at the first global root node, wherein each pair of adjacent nodes of the plurality of nodes consists of a first node and second node such that the first node is configured to provide a digital certificate for certifying the second node and the second node is configured to provide a digital certificate for certifying the first node; and providing a first chain of digital certificates in a first nodal path from the first global root node across the node network to a first entity node, wherein the first chain of digital certificates enables the first user to verify a public key of the first entity node;

wherein the nodes of the plurality of nodes are trusted authorities arranged in a hierarchy having L levels denoted as levels 1, 2, 3, ... L subject to L being at least 3;

wherein level 1 consists of a highest node of the hierarchy;

wherein level j consists of at least two nodes of the hierarchy, each node of level j being a child node of level j-1 for j=2, 3, ..., L;

wherein level 3 consists of at least three nodes of the hierarchy;

wherein the first entity node is a node of a level of at least 3 and not exceeding L;

wherein the first global root node is a selected node of level 2;

wherein the method further comprises prior to said providing the first root public key for the first user and prior to said providing the first chain of digital certificates:

arranging a common liability agreement among the nodes of level 2 by which the nodes of level 2 agree to accept liability to any user who selects a node of level 2 as a global root node in a chain of digital certificates for verifying a public key of any other node of the hierarchy, said arranging being performed by the highest node of the hierarchy; and after said arranging, receiving an identification from the user of the first global root node after the user selected the first global root node as the selected node of level 2.

17. The computer program product of claim 16, wherein the first nodal path consists of N sequentially ordered nodes $X_1, X_2, \ldots, X_N$ respectively comprising digital certificates $C_1, C_2, \ldots, C_N$;

wherein $X_1$ is the first global root node and $X_N$ is the first entity node;

wherein $C_1, C_2, \ldots, C_N$ defines the first chain of digital certificates;

wherein the digital certificate $C_{i+1}$ comprises a public key $PK_{i+1}$ and an authentication block signed using a private key of node $X_i$ for i=1, 2, ..., N-1;

wherein $PK_N$ is the public key of the first entity node;

wherein N is a positive integer of at least 2;

wherein the digital certificate $C_1$ of the first global root node $X_1$ is a self-signed digital certificate that comprises both a public key $PK_1$ of the first global root node $X_1$ and an authentication block signed using a private key of the first global root node $X_1$, and wherein the digital certificate $C_1$ of the first global root node represents the first root public key; and wherein for i=1, 2, ..., N: digital certificate $C_i$ comprises certificate information consisting of the authentication block, the public key $PK_i$, a certificate number, a function used to digest a digital signature of the signed authentication block, an encryption algorithm used to encrypt the authentication block, a name of a certifying source issuing the digital certificate, an IP address of a directory held by the certifying source, a distinguished name identifying node $X_i$, and an expiry date of the public key $PK_i$.

18. The computer program product of claim 16, wherein the plurality of nodes that comprises a second global root node and a second global root node that differs from the first global root node, and wherein the method further comprises:

providing a second root public key for a second user by a second means outside the public key infrastructure, said second root public key being at the second global root node; and providing a second chain of digital certificates in a second nodal path from the second global root node across the node network to the second entity node, wherein the second chain of digital certificates enables the second user to verify a public key of the second entity node.

19. The computer program product of claim 18, wherein the second entity node is the first global root node.

20. The computer program product of claim 19, wherein the second global root node is the first entity node.

21. The computer program product of claim 20, wherein the first nodal path consists of N sequentially ordered nodes $X_1, X_2, \ldots, X_N$ respectively comprising digital certificates $C_1, C_2, \ldots, C_N$, wherein $X_1$ is the first global root node and $X_N$ is the first entity node, and wherein the second nodal path consists of the N sequentially ordered nodes $X_N, \ldots, X_2, X_1$, and wherein N is a positive integer of at least 3.

* * * * *